United States Patent [19]

Hirata et al.

[11] Patent Number: 5,204,772

[45] Date of Patent: Apr. 20, 1993

[54] ELECTRICALLY RESPONSIVE LIGHT CONTROLLING DEVICE

[75] Inventors: Masahiro Hirata, Takatsuki; Masato Hyohdou, Nishinomiya; Hiroaki Tada, Kobe; Yasuhiro Saito, Nishinomiya; Hideo Kawahara, Minoo, all of Japan

[73] Assignee: Nippon Sheet Glass Co., Ltd., Osaka, Japan

[21] Appl. No.: 797,856

[22] Filed: Nov. 26, 1991

[30] Foreign Application Priority Data

Nov. 28, 1990 [JP] Japan ............... 2-331080

[51] Int. Cl.$^5$ .................. G02B 26/00; G02B 5/02
[52] U.S. Cl. .................. 359/296; 252/582
[58] Field of Search ........... 359/296; 252/582

[56] References Cited

U.S. PATENT DOCUMENTS

| | | | |
|---|---|---|---|
| 3,257,903 | 6/1966 | Marks | 359/296 |
| 3,773,684 | 11/1973 | Marks | 359/296 |
| 4,345,820 | 8/1982 | Chabrolle | |
| 4,442,019 | 4/1984 | Marks | |
| 4,657,349 | 4/1987 | Labes et al. | |
| 4,663,083 | 5/1987 | Marks | |
| 4,919,521 | 4/1990 | Tada et al. | 359/296 |

FOREIGN PATENT DOCUMENTS 56-32609 2/1973 Japan.
1124678 8/1968 United Kingdom.

OTHER PUBLICATIONS

Marks, *Applied Optics*, 8, 1397, (1969).

*Primary Examiner*—Bruce Y. Arnold
*Assistant Examiner*—Evelyn A. Lester
*Attorney, Agent, or Firm*—Armstrong, Westerman, Hattori, McLeland & Naughton

[57] ABSTRACT

A light controlling device having excellent controllability of light and solar energy transmission which comprises a suspension of anisotropic particles in an liquid dielectric medium and a pair of electrodes for applying an electric field to said suspension, and said anisotropic particles having an aspect ratio of at least 3.5 and comprising an inorganic titanium compound having an absorption coefficient of at least $5 \times 10^3 \, cm^{-1}$, especially a titanium compound of the formula: TiOxNy wherein $1.37 \leq x+y \leq 1.95$ and $0.15 \leq y \leq 0.92$.

2 Claims, 6 Drawing Sheets

ELECTRICALLY RESPONSIVE LIGHT CONTROLLING DEVICE

BACKGROUND OF THE INVENTION

The present invention relates to an electrically responsive light controlling device, and more particularly to a light controlling device having an excellent controllability of light transmittance.

In recent years, a demand for controlling the transmittance of window glasses is increasing in various fields using a glass. Among others, in the fields of building and vehicles, it is strongly demanded from the viewpoint of energy saving to impart a light controlling ability to a glass, because entering of solar radiation energy into a room through windowpanes greatly affects the load of air conditioning in room. Also, there is growing interest in a glass having a light controllability from the viewpoint of utilizing it as a so-called display device by locally and selectively changing the transmittance and/or reflectance of the glass.

With respect to such materials and devices having a light transmission controllability, attention has been paid for the last few decades to an electrochromic device (EC device) using an electrochemically color developing material such as tungsten oxide, molybdenum oxide or nickel oxide. The studies thereof have been earnestly continued in various fields, and the technique has advanced to such a degree as being put to practical use on small glass products, such as glasses and automobile mirrors. However, these products driven by an electric current leads to an inevitable voltage drop and an increase in the surface area results in a marked decrease in speed of response. In addition, a side reaction, accelerated by injection and rejection of a large amount of electricity, causes degradation of the constituting materials. For such reasons, it has become clear that it is very difficult to realize practical EC devices having a large area by merely utilizing the fabrication technique for EC devices having a small area.

As devices to be substituted for such EC devices of electric current actuation type, attention is paid to light controlling devices of voltage actuation type. The representative example is a liquid crystal device using encapsulated liquid crystal as disclosed in Japanese Patent Publication Kokai No. 58-501631. This device merely controls the parallel transmission by change in a degree of diffusion of transmitted light based on control of orientation of liquid crystal molecules and, therefore, it is unsatisfactory for controlling energy transmission which is demanded for light controlling devices.

For this reason, attention is being paid to a light controlling device wherein anisotropic particles having a strong light absorptivity are suspended in a liquid dielectric medium and the light transmittance of the suspension is controlled by applying an electric field to the suspension (the device of this type being hereinafter referred to as "DPS (Dipole Particle Suspension) device") in order to provide a light controlling device of voltage actuation type which is considered that large area application would be relatively easy and which can also control energy transmission in a wide range. The DPS device called light valve is known from the mid-1960s, and proposals concerning the DPS device have been made, for example, in U.S. Pat. No. 3,257,903 and Japanese Patent Publication Kokai No. 51-69038. Proposed anisotropic particles suitable for the DPS device include a halide such as a perhalide of an alkaloid acid salt as represented by herapathite, a polarizing metal halide or other halides; fine particles of an organic compound such as nafoxidine hydrochloride or guanine; fine particles of an inorganic compound such as basic lead carbonate, bismuth oxychloride, lead hydrogenarsenate, lead hydrogenphosphate, graphite, mica or garnet; and mica or glass flakes covered with a metal or metal oxide such as aluminum, chromium, gold, palladium, silver, tantalum, titanium, tin oxide, titanium oxide or vanadium pentaoxide. Among others, attempts to put the DPS device into practical use using herapathite particles have been earnestly made. On the other hand, in the case of DPS devices using herapathite particles, an electrically induced optical change in near-infrared region is negligible and the particles themselves are poor in UV resistance and, therefore, application to control of solar energy transmission, namely to a light controlling glass, has been considered very difficult.

In view of such circumstances, the present inventors have already proposed some improved anisotropic particles, e.g. particles covered with a metal or an organometallic compound (Japanese Patent Publication Kokai No. 64-38732), particles covered with a tungsten bronze film (Japanese Patent Publication Kokai No. 64-57242) and particles covered with a compound of the formula: $Ti_nO_{2n-1}$ (Japanese Patent Publication No. 1-126629). These particles have a high light absorptivity and a good resistance to ultraviolet rays. However, problems are encountered in putting a DPS device using these particles into practical use. That is to say, the particles covered with a metal have the problems that it is difficult to form an insulation film having a good adhesiveness on the metal film, and that the dispersibility of the particles is not satisfactory. The particles covered with tungsten bronze have the drawbacks that they are dissolved in even a slight amount of water, and that positive holes produced by absorbing ultraviolet rays oxidatively decompose surrounding organic materials. Also, in the case of the particles covered with a compound of the formula: $Ti_nO_{2n-1}$, realization of properties sufficient for light controlling glass requires one to increase the absorption coefficient and/or to increase the covering thickness because the absorption characteristics are determined by both the absorption coefficient and the thickness of the covering material. However, any of the particles capable of practically functioning as a DPS device have upper limits thereof and, therefore, the controllable range for solar energy transmission is at most 16% even with the use of the best particles.

In general, as for the light controlling range desired in practical use of a device having a light controlling ability like a DPS device, it is considered that the range must exceed the difference of transmittance between a transparent window glass and a heat absorbing window glass intended to absorb solar energy. Accordingly, it may be said that the required control range is at least 20% in terms of variation ($\Delta T$) of solar energy transmittance. This light control range has not been attained by any known anisotropic particles.

It is a primary object of the present invention to provide a light controlling device which can control the solar energy transmittance with the variation $\Delta T$ of at least 20%.

A further object of the present invention is to provide a light controlling device which has excellent controllability of light transmittance and solar energy transmittance and which is suitable for use as a light controlling glass, a display device of light transmitting or light reflecting type, and for other various purposes.

These and other objects of the present invention will become apparent from the description hereinafter.

SUMMARY OF THE INVENTION

In accordance with the present invention, there is provided a light controlling device comprising a suspension of anisotropic particles in a dielectric medium and a pair of electrodes for applying an electric field to said suspension, said anisotropic particles having a form anisotropy of at least 3.5 in aspect ratio and comprising an inorganic titanium compound having an absorption coefficient of at least $5 \times 10^3$ cm$^{-1}$.

DETAILED DESCRIPTION

The light controlling device of the present invention will be explained with reference to the drawings.

Figure 1:
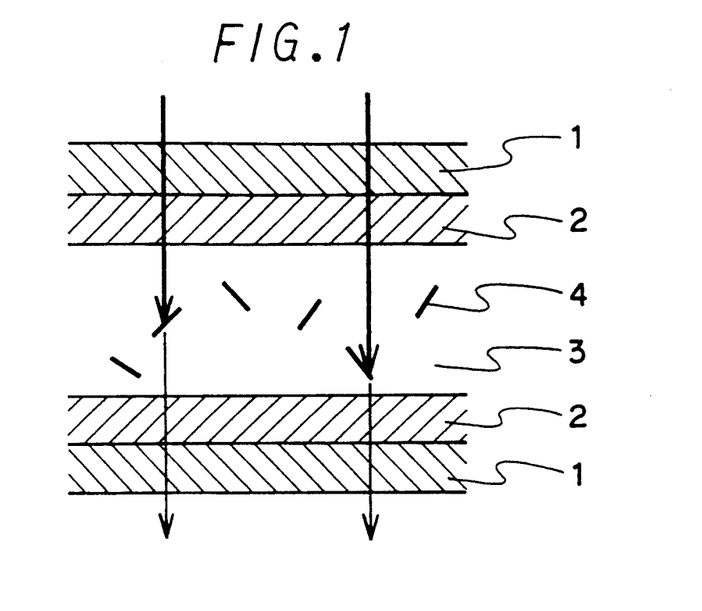
FIG. 1 is an illustrative section view showing the closed state of the light controlling device according to the present invention and how the incident light transmits through the device.
Figure 2:
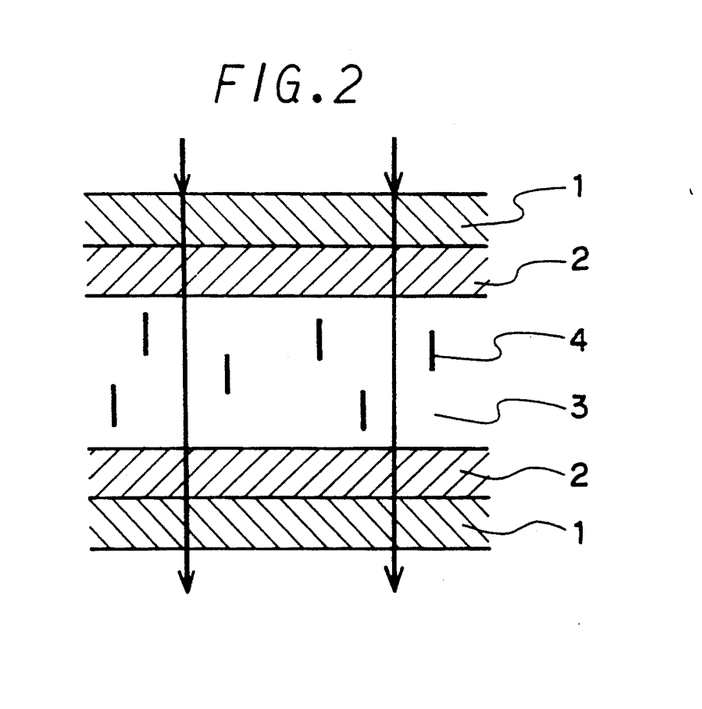
FIG. 2 is an illustrative view showing the open state of the light controlling device according to the present invention and how the incident light is absorbed in the device.

FIG. 1 is an illustrative view showing the opaque state of a light controlling device in the case where the action of an electric field is released in the device (closed state). FIG. 2 is an illustrative view showing the transparent state of a light controlling device in the case where an electric field is applied in the device (open state).

In FIGS. 1 and 2, the device of the present invention comprises spaced parallel substrates 1, typically transparent plates, and transparent electrically conductive films 2 as electrodes provided on each of the surfaces of the substrates 1. Anisotropic particles 4 are dispersed in a liquid dielectric substance 3, and the anisotropic particles 4 suspended in liquid 3 are retained between the substrates 1 spaced apart and provided with the electrodes 2.

As the substrate 1, any of known materials used for light controlling devices, displace devices or the like can be used without any restriction. A typical substrate is a soda lime glass. The shape and size of the substrate 1 are suitably determined. At least one of a pair of the substrates is transparent.

The transparent electrically conductive film 2 used in the present invention is not particularly limited, and those conventionally used in light controlling devices, display devices or the like can be used. Representative examples of the transparent electrically conductive film 2 are, for instance, ITO (indium-tin oxide) and SnO$_2$. The thickness of the film 2 is not particularly limited, but it is preferable that the film thickness is optically designed so that the reflection of the device becomes minimum. An instance of such a film thickness is 180 nm when the film is a SnO$_2$ film.

As the liquid dielectric substances 3, there are preferably used those having a high insulation property and a high weatherability, and having a viscosity of such a degree as capable of allowing the dispersed particles 4 to undergo moderate Brownian motion, and also having an effect of preventing the particles 4 from sedimenting in the dielectric liquid 3. The viscosity which satisfies these requirements is usually from 0.65 to 1,000 cSt. Such liquid dielectric substances can be selected from conventionally used dielectric substances. Among others, liquid organosiloxane polymers are preferred from the viewpoint that the operation temperature of the device is usually from −20° C. to 80° C.

The particles 4 used in the present invention are inorganic titanium compound particles having a form anisotropy. It is essential that the particles have an aspect ratio of at least 3.5, and the inorganic titanium compound has an absorption coefficient of at least $5 \times 10^3$ cm$^{-1}$.

In the present invention, the absorption coefficient of the material is determined as follows: Mixtures of carbon black and TiO$_2$ with various carbon black contents are used to define the relationship between absorption coefficient and relative photoacoustic signal intensity in the wavelength region of 500 to 550 nm. Using this relationship, a relative photoacoustic signal intensity of a sample-TiO$_2$ mixture leads to an absorption coefficient of the sample.

Considering the interaction between light and particles, from the geometrical optics viewpoint, the aspect ratio of the particles can be understood as a factor of determing the interception area of an incident light in the open state and the closed state of the device. Accordingly, if the particles have a large aspect ratio, the light interception area greatly varies between the open state and the closed state, thus the use of such particles enables one to produce a light controlling device having an excellent controllability of light transmission.

Also, the absorption coefficient can be understood as a factor in determining the light intercepting efficiency in the case that the light interception area is constant. That is to say, the larger the absorption coefficient, the higher the light controllability.

It is important in achieving the solar energy transmittance variation $\Delta T$ of not less than 20% that the anisotropic particles have the above specified aspect ratio and absorption coefficient.

Preferably, the anisotropic particles further have such a particle size that the major axis of the particle is at most 3 μm, especially not more than the wavelength of visible light, namely not more than 0.7 μm, in addition to the above specified aspect ratio.

The aspect ratio and the absorption coefficient depend greatly on the material constituting the anisotropic particles. It has now been found that fine particles of inorganic titanium compounds satisfy the above-mentioned conditions, and that particles of a titanium compound of the formula: TiOxNy wherein $1.37 \leq x+y \leq 1.95$ and $0.15 \leq y \leq 0.92$, are particularly preferable as the anisotropic particles to be dispersed in a dielectric medium. The reason why the TiOxNy compound gives particularly excellent results is considered to be mainly based on the fact that it has a strong absorption which weakly depends on the wavelength. As is well known, the solar spectrum spreads over a wide range of wavelength from the visible region to the near infrared region. Accordingly, for controlling the transmittance and reflectance of the sunlight by a light controlling device, it is required that the particles have a large absorption coefficient over a wide range of wavelength. The TiOxNy compound has a large absorption coefficient throughout the whole solar spectrum. For example, the particles of the titanium oxide nitride defined by the above formula TiOxNy have a larger absorption coefficient, which weakly depends on the wavelength, as compared to that of the particles of titanium oxide of the formula: $Ti_nO_{2n-1}$. Also, the TiOxNy particles do not show a strong absorption in a short wavelength region as seen in the $Ti_nO_{2n-1}$ particles. This strong absorption in a short wavelength region is based on a band gap, and the absence of this strong absorption suggests that deterioration of anisotropic particles and an influence on the liquid dielectric substance are very small.

The anisotropic particles of the titanium oxide nitride can be prepared by various known methods for the preparation of fine particles of oxides, metals and the like. For example, the titanium oxide nitride particles can be prepared by thermally treating a titanium compound having an anisotropy form in an atmosphere containing nitrogen, in detail, by placing titanium oxide of anisotropic shape in a furnace and reacting it with $NH_3$, hydrozine or a nitrogen-containing organic compound such as methylamine at a high temperature, for example, at 800° C. for 3 hours. As the titanium compound having an anisotropic form, titanate compounds of the formula: $M(II)TiO_3$ wherein M(II) is a divalent metal such as Ba, Pb or St may be used as well as titanium oxide.

The titanium compound particles of anisotropic shape are dispersed in a liquid dielectric substance. The concentration of the particles in the resulting suspension is usually from 1 to 10% by weight.

As a means for applying an electric field to the anisotropic particles dispersed in the dielectric medium, conventional means used for devices of this type can be used in the present invention without any restriction. Since the intensity of electric field is inversely proportional to the spacing between two electrodes, the smaller the electrode spacing, the lower voltage is sufficient for obtaining the same required electric field intensity. From such a point of view, the spacing between the electrodes is selected usually from 5 to 5 μm.

The light controlling device of the present invention has an excellent controllability of light transmittance and energy transmittance. It is also usable as display device of transmission type or reflection type by utilizing its excellent light controllability.

The present invention is more specifically described and explained by means of the following Examples. It is to be understood that the present invention is not limited to the Examples.

EXAMPLE 1

In a standing type tubular furnace was placed 500 mg of needle-shaped $TiO_2$ particles having an average aspect ratio of 5. After evacuating the furnace, the particles were pre-heated with introducing a nitrogen gas at 200 ml/minute under atmospheric pressure. Thereafter, the introducing gas was changed to ammonia gas, and the furnace temperature was maintained at 850° C. for 3 hours. Simultaneously with stopping the heating, the furnace was evacuated to remove the remaining ammonia gas and was cooled to room temperature in a nitrogen gas stream to give the reduction product (TiOxNy) of $TiO_2$ powder.

In order to investigate the crystal structure of the obtained powder, X-ray diffraction analysis of the powder was performed. The result is shown in FIG. 3.

For comparison, X-ray diffraction analysis of $Ti_2O_3$ standard sample powder (purity 99.9%), TiO standard sample powder (purity 99.9%) and TiN standard sample powder (purity 99.9%) was carried out under the same conditions as above. They are also shown in FIG. 3.

Figure 3:
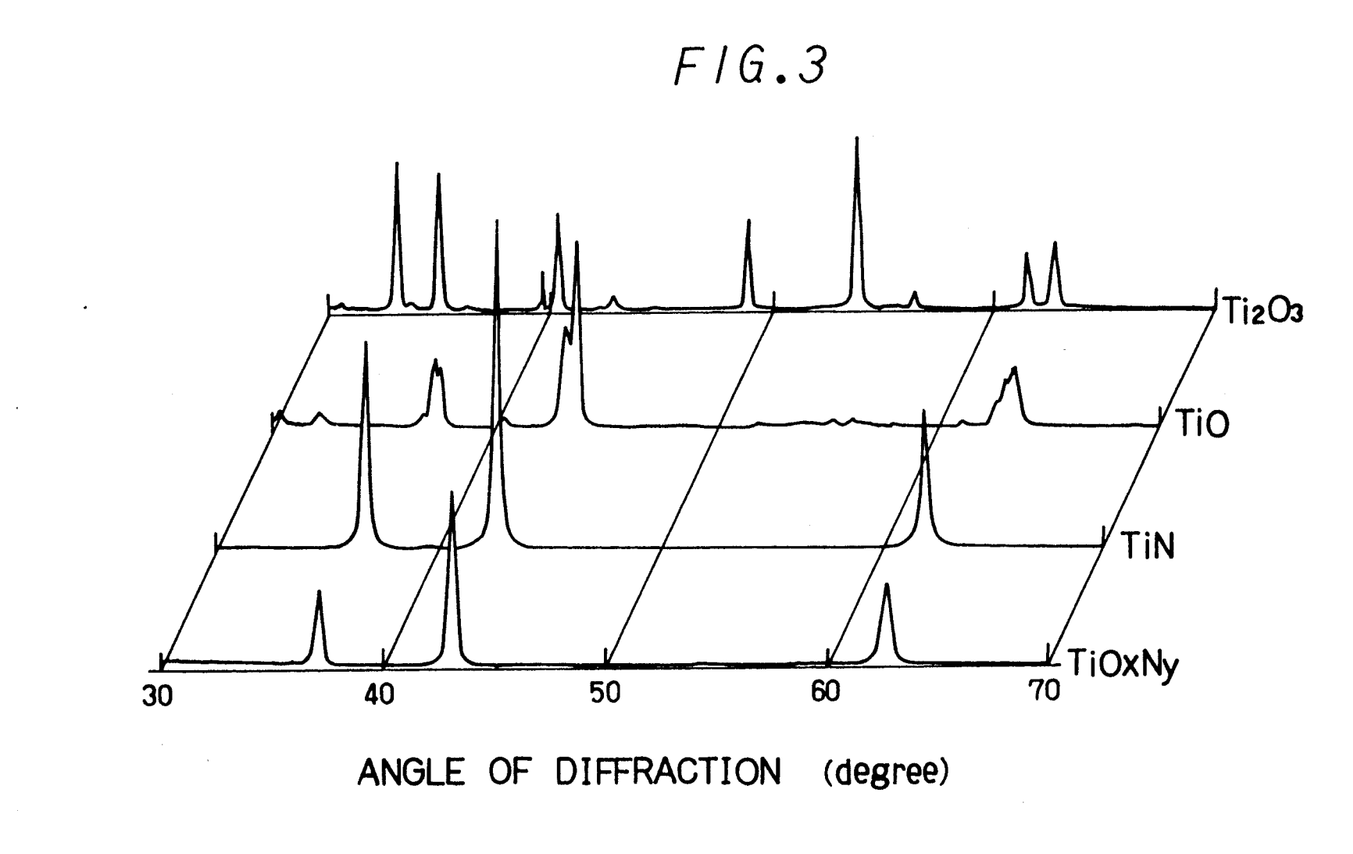
FIG. 3 is X-ray diffraction patterns of TiOxNy prepared in Example 1 described after, Ti$_2$O$_3$, TiO and TiN.

It is observed in FIG. 3 that the reduction product of $TiO_2$ powder shows a diffraction pattern similar to that of TiN, but the peak positions thereof are close to those of TiO.

Further, the absorption characteristics of the $TiO_2$ reduction product, $Ti_2O_3$, TiO and TiN were measured by photoacoustic spectroscopy wherein each sample powder was diluted with a MgO powder to 1% by volume. The results are shown in FIG. 4.

Figure 4:
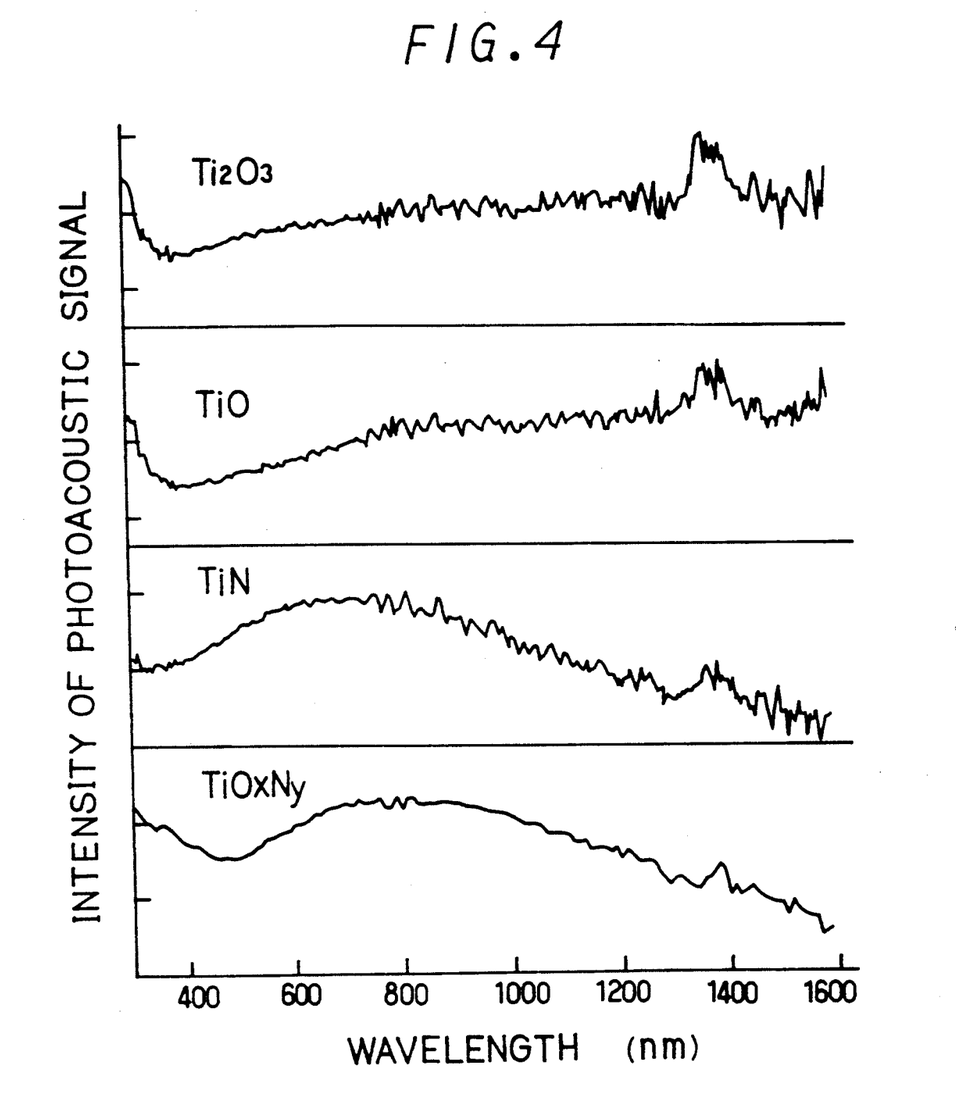
FIG. 4 is photoacoustic spectrums of TiOxNy prepared in Example 1 described after, Ti$_2$O$_3$, TiO and TiN.

It is observed in FIG. 4 that the photoacoustic spectrum, hence the absorption spectrum, of the $TiO_2$ reduction product is similar to that of the TiN powder.

From the above results, it is considered that the $TiO_2$ reduction product would be a compound composed of titanium, oxygen and nitrogen rather than a compound of titanium and oxygen. The oxygen and nitrogen contents of the reduction product were then measured by an inert gas fusion method, thus it was confirmed that the $TiO_2$ reduction product is a compound represented by $TiO_{0.45}N_{0.92}$.

EXAMPLE 2

The procedure of Example 1 was repeated except that the reaction was carried out at 750° C. for 3 hours to produce a TiOxNy powder.

The obtained powder was dispersed in polydimethylsiloxane in a concentration of 3% by weight. A slight amount of spherical spacers having an average diameter of 25 μm was added to the resulting liquid suspension and thoroughly admixed. The suspension was filled in a cell comprising two glass plates (sheet resistivity 200 Ω/□) spaced apart and provided with transparent electrically conductive films to provide a light controlling device.

The transmittance spectrums of the device were measured under no application of an electric field (closed state) and under application of an AC voltage of 40 V-60 Hz (open state).

Figure 5:
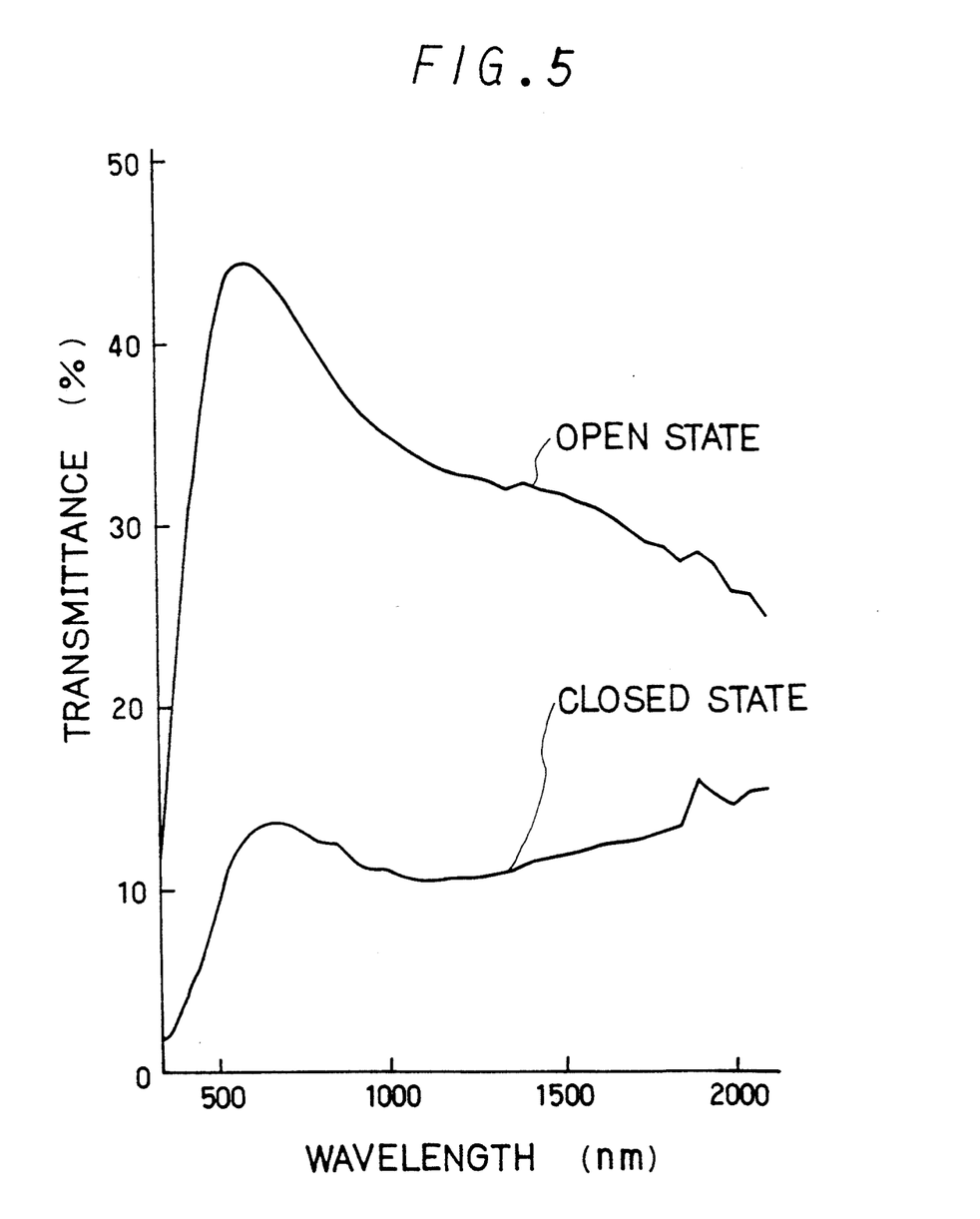
FIG. 5 is a graph showing the percent transmittance in the open and closed states of the light controlling device according to the present invention produced in Example 2 described after.

The results are shown in FIG. 5.

The transmittance of the sunlight under the open or closed state calculated from the spectrums according to JIS R 3106 was 37.5% and 11.1% respectively, thus it was found that the solar energy transmittance variation ΔT of the device was 26.4%.

EXAMPLES 3 TO 10 AND COMPARATIVE EXAMPLES 1 TO 3

Various TiOxNy powders having different compositions were prepared in the same manner as in Example 1 except that the reaction was carried out under the conditions shown in Table 1.

The aspect ratios of the obtained powders were measured by a transmission electron microscope. Also, the average absorption coefficients of the powders in the wavelength region of 500 to 550 nm were obtained from the relative intensities of the photoacoustic signal of the powders by using those of carbon black as the standard.

The results are shown in Table 1.

Light controlling devices were prepared in the same manner as in Example 2 by using the obtained powders.

The results of the measurement of $\Delta T$ are shown in Table 1.

From the results shown in Table 1, it is found that a powder of a titanium compound having an aspect ratio of not less than 3.5 and an absorption coefficient of not less than $5 \times 10^3$ cm$^{-1}$ provides a light controlling device having a $\Delta T$ of not less than 20%.

TABLE 1

|  | Temperature in furnace (°C.) | Heating time (hour) | Aspect ratio | Absorption coefficient ($10^3$/cm) | $\Delta T$ (%) |
|---|---|---|---|---|---|
| Com. Ex. 1 | 700 | 1 | 5.0 | 1.0 | 18 |
| Ex. 3 | 725 | 2 | 3.5 | 5.0 | 20 |
| Ex. 4 | 700 | 3 | 5.0 | 5.0 | 25 |
| Ex. 5 | 725 | 4 | 3.5 | 10 | 25 |
| Ex. 6 | 700 | 4 | 5.0 | 10 | 30 |
| Com. Ex. 2 | 800 | 2 | 2.0 | 46 | 15 |
| Ex. 7 | 750 | 4 | 3.5 | 46 | 32 |
| Ex. 8 | 700 | 6 | 5.0 | 46 | 40 |
| Com. Ex. 3 | 900 | 2 | 2.0 | 150 | 18 |
| Ex. 9 | 850 | 3 | 3.5 | 150 | 35 |
| Ex. 10 | 800 | 6 | 5.0 | 150 | 45 |

The compositions of the powders of Examples 3 to 10 and Comparative Examples 1 to 3 were analyzed in the same manner as in Example 1. The relationship of the composition of TiOxNy powder and the absorption coefficient is shown in FIG. 6.

Figure 6:
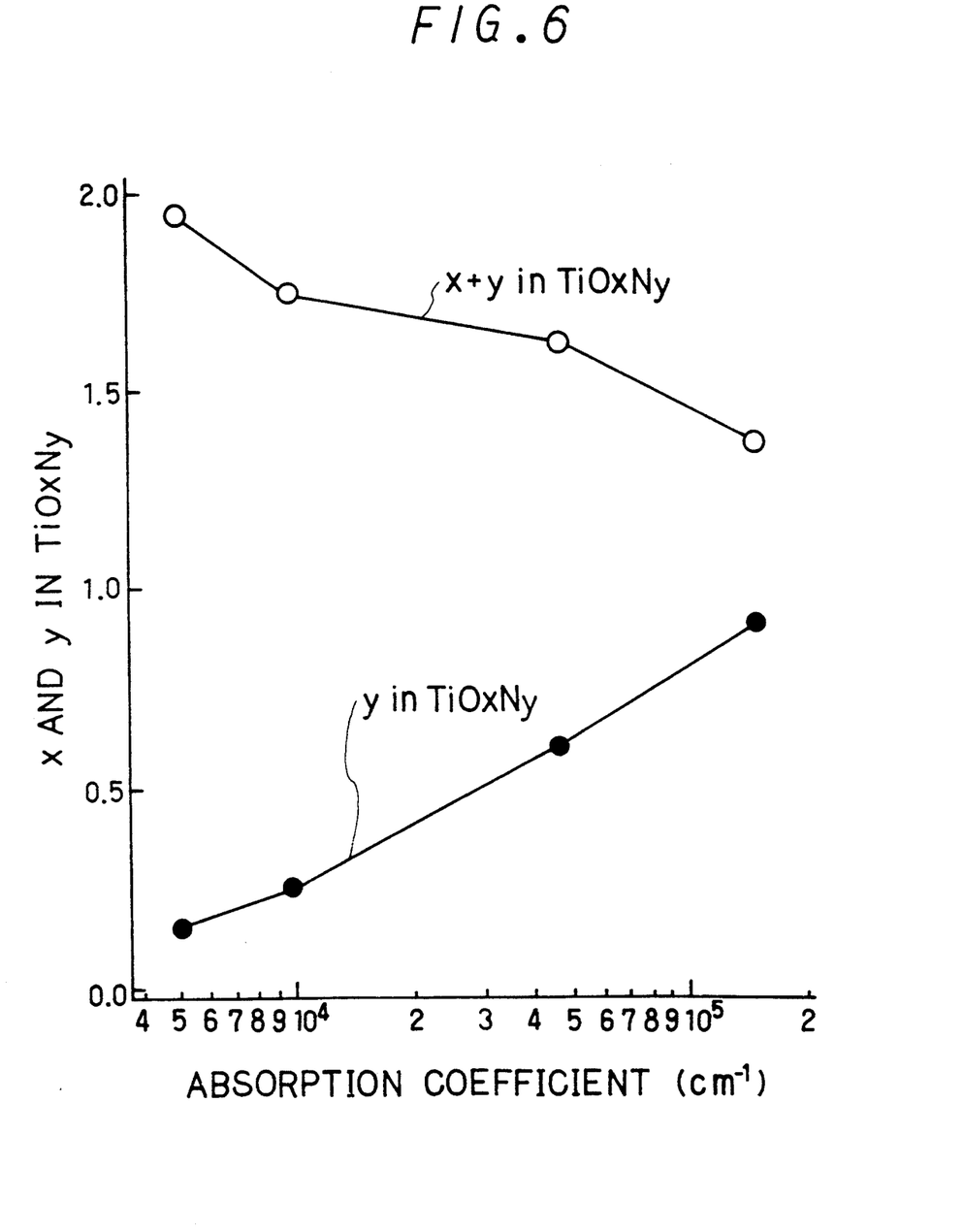
FIG. 6 is a graph showing the relationship between the composition of TiOxNy and the light absorption coefficient.

From the results shown in Table 1 and FIG. 6, it would be understood that a TiOxNy powder satisfying the conditions: $1.37 \leq x+y \leq 1.95$ and $0.15 \leq y \leq 0.92$ provides a light controlling device having a $\Delta T$ of not less than 20%.

COMPARATIVE EXAMPLE 4

The procedure of Example 1 was repeated except that carbon monoxide was used instead of ammonia gas and the reaction was carried out at 950° C., to give a powder of TiOx. The oxygen content of the product measured by an inert gas fusion method was 31.4% by weight, thus it was confirmed that the product was TiO$_{1.39}$.

With respect to the obtained TiOx powder and the TiOxNy powder prepared in Example 1, the photoacoustic signal intensity was measured. The results are shown in FIG. 7.

Figure 7:
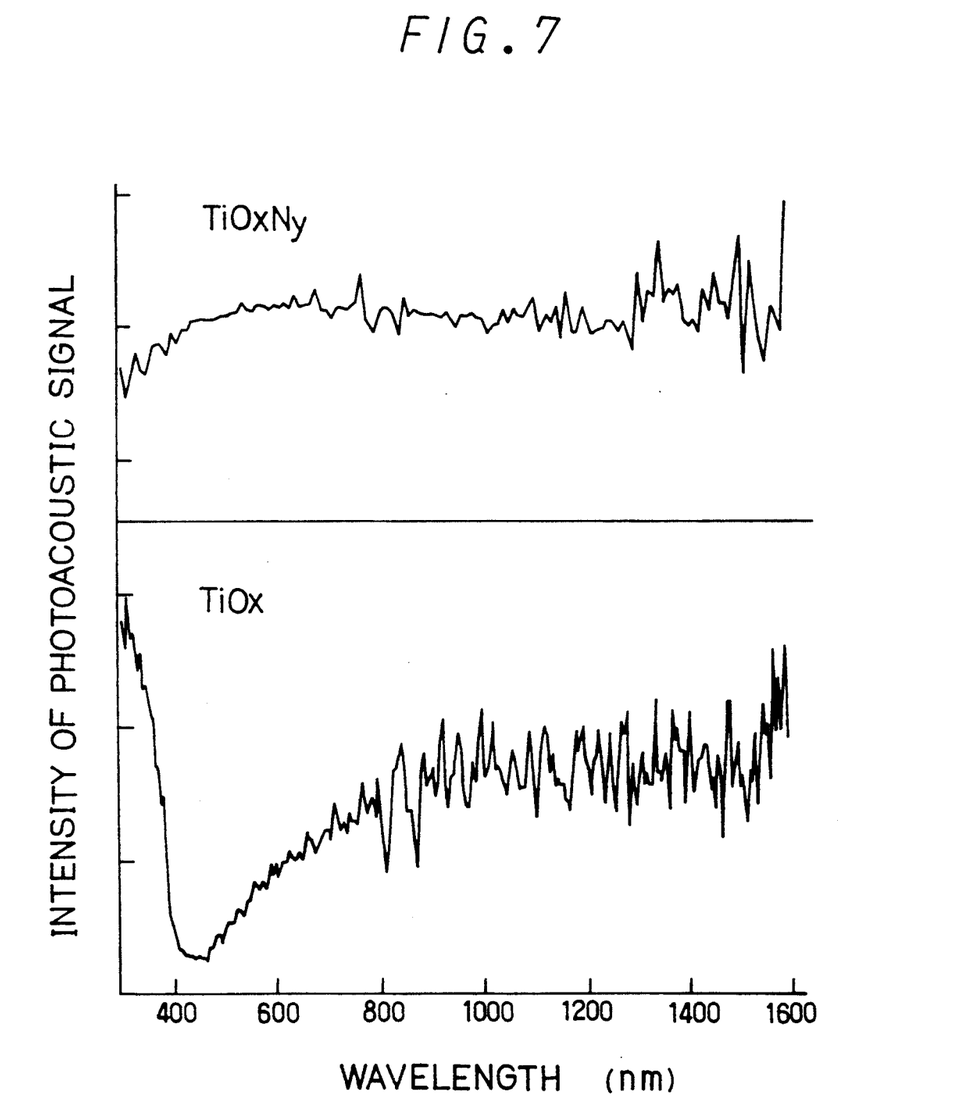
FIG. 7 is photoacoustic spectrums of TiOxNy prepared in Example 1 described after and TiOx prepared in Comparative Example 4 described after.

It is observed in FIG. 7 that the TiOx powder shows a strong absorption in the ultraviolet region, and the absorption increases as the wavelength becomes larger over the visible region to the near infrared region. On the other hand, the TiOxNy powder of Example 1 shows a strong absorption in all regions of the wavelength measured, thus it would be understood that the photoacoustic signal intensity reaches the saturation value in the measured wavelength region and becomes an approximately constant value independent of the absorption coefficient.

COMPARATIVE EXAMPLE 5

There was treated 500 mg of TiO$_2$-covered mica particles (major axis: 3 μm, average thickness: several tens of nm) in the same manner as in Comparative Example 4 to give particles whose surface was covered with Ti$_n$O$_{2n-1}$.

A light controlling device was prepared in the same manner as in Example 2 using the obtained particles, but the solar energy transmittance variation $\Delta T$ of the device was 12%.

In addition to the ingredients used in the Examples, other ingredients can be used in the Examples as set forth in the specification to obtain substantially the same results.

What we claim is:

1. A light controlling device comprising a suspension of anisotropic particles in a dielectric medium and a pair of electrodes for applying an electric field to said suspension, said anisotropic particles having a form anisotropy of at least 3.5 in aspect ratio and comprising an inorganic titanium compound of the formula: TiOxNy wherein $1.37 \leq x+y \leq 1.95$ and $0.15 \leq y \leq 0.92$ and having an absorption coefficient of at least $5 \times 10^3$ cm$^{-1}$.

2. The device of claim 1, wherein at least one of said pair of electrodes is a transparent electrode provided on the surface of a glass substrate.

* * * * *